United States Patent
Depondt (10) Patent No.: US 8,973,209 B2
(45) Date of Patent: Mar. 10, 2015

(54) CONNECTING APPARATUS FOR HINGING A JOINING ELEMENT RIGIDLY CONNECTED TO A WIPER ARM

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 535 days.

(21) Appl. No.: 13/318,189

(22) PCT Filed: Mar. 10, 2010

(86) PCT No.: PCT/EP2010/053002
§ 371 (c)(1),
(2), (4) Date: Oct. 31, 2011

(87) PCT Pub. No.: WO2010/124896
PCT Pub. Date: Nov. 4, 2010

(65) Prior Publication Data
US 2012/0047673 A1    Mar. 1, 2012

(30) Foreign Application Priority Data
Apr. 30, 2009   (DE) .......................... 10 2009 002 764

(51) Int. Cl.
*B60S 1/38*   (2006.01)
*B60S 1/40*   (2006.01)

(52) U.S. Cl.
CPC ............... *B60S 1/387* (2013.01); *B60S 1/4003* (2013.01); *B60S 1/4006* (2013.01); *B60S 1/4019* (2013.01);
(Continued)

(58) Field of Classification Search
CPC ................. B60S 1/4038–1/4048; B60S 1/386; B60S 1/387; B60S 1/4087
USPC ............ 15/250.32, 250.43, 250.361, 250.451
See application file for complete search history.

(56) References Cited

U.S. PATENT DOCUMENTS 7,481,596 B2 *  1/2009  Thienard ........................ 403/329
8,429,786 B2 *  4/2013  Van Baelen et al. ....... 15/250.32
(Continued)

FOREIGN PATENT DOCUMENTS

DE         10349637        6/2005
DE    102006031514 A1 *   1/2008  ............... B60S 1/40
(Continued)

OTHER PUBLICATIONS

DE102006031514A1 (machine translation), 2008.*
PCT/EP2010/053002 International Search Report.

*Primary Examiner* — Mark Spisich
*Assistant Examiner* — Andrew A Horton
(74) *Attorney, Agent, or Firm* — Michael Best & Friedrich LLP (57) ABSTRACT

The invention relates to a connecting apparatus (24) for hinging a joining element (100, 102, 104, 142, 152, 162, 122 166), which is rigidly connected to a wiper arm, by way of an adapter (62), which is held non-rotatably by the joining element (100, 102, 104, 142, 152, 162, 166), to a connecting element (26) fastened to a wiper blade (10), wherein between the connecting element (26) and the adapter (62) a joint (52, 82) running transversely to the longitudinal direction of the wiper blade (10) is provided, and the adapter (62) forms a frame of two side walls (64) of a front end wall (66) and a rear end wall (70), the frame being partially covered toward the top in the region of the front end wall (66) by a cover wall (68) such that an opening (74) remains toward the rear end wall (70). It is proposed that the adapter (62) has means (76, 78, 80, 86) which are suited for mounting and fixing three different joining elements (100, 102, 104).

23 Claims, 8 Drawing Sheets

(52) U.S. Cl.
CPC ............... *B60S 1/4038* (2013.01); *B60S 1/407* (2013.01); *B60S 1/4083* (2013.01); *B60S 1/4087* (2013.01); *B60S 1/386* (2013.01); *B60S 2001/4054* (2013.01)
USPC .................................................... 15/250.32

(56) References Cited

U.S. PATENT DOCUMENTS

| | | | |
|---|---|---|---|
| 8,479,350 B2* | 7/2013 | Kim et al. ................. | 15/250.32 |
| 2003/0066153 A1 | 4/2003 | Rosenstein et al. | |
| 2006/0117515 A1* | 6/2006 | Fink et al. ................. | 15/250.32 |
| 2007/0226940 A1* | 10/2007 | Thienard .................... | 15/250.32 |
| 2008/0086830 A1* | 4/2008 | Kim ........................... | 15/250.32 |
| 2009/0064438 A1* | 3/2009 | Boland et al. ............. | 15/250.32 |
| 2009/0199357 A1* | 8/2009 | Thienard .................... | 15/250.32 |
| 2009/0307862 A1* | 12/2009 | Boland ....................... | 15/250.32 |
| 2011/0072607 A1* | 3/2011 | Van Baelen et al. ....... | 15/250.32 |
| 2011/0113583 A1* | 5/2011 | Shanmugham et al. ... | 15/250.32 |

FOREIGN PATENT DOCUMENTS

| | | | | |
|---|---|---|---|---|
| EP | 1568559 | | 8/2005 | |
| EP | 1666320 | | 6/2006 | |
| EP | 1849666 | | 10/2007 | |
| EP | 1995130 | | 11/2008 | |
| EP | 2143603 | | 1/2010 | |
| FR | 2865699 | | 8/2005 | |
| KR | 200438836 | | 3/2008 | |
| KR | 100891195 B1 * | 3/2009 | ................ B60S 1/40 |
| KR | 100903374 | | 6/2009 | |
| RU | 2251500 | | 5/2005 | |
| WO | 2004024520 | | 3/2004 | |
| WO | 2005/039944 | | 5/2005 | |
| WO | 2008/003675 | | 1/2008 | |
| WO | 2008/035308 | | 3/2008 | |
| WO | WO 2008135308 A1 * | 11/2008 | ................ B60S 1/40 |
| WO | 2009133979 | | 11/2009 | |
| WO | 2010028866 | | 3/2010 | |
| WO | 2010/124896 | | 11/2010 | |

* cited by examiner

CONNECTING APPARATUS FOR HINGING A JOINING ELEMENT RIGIDLY CONNECTED TO A WIPER ARM

REFERENCE TO RELATED APPLICATIONS

This application is a 371 of PCT/EP2010/053002, filed Mar. 10, 2010, which claims the priority of German Application No. 10 2009 002 764.5, filed Apr. 30, 2009, the entire contents of which are incorporated herein by reference.

BACKGROUND OF THE INVENTION

The invention relates to a connecting apparatus for hinging a joining element, which is rigidly connected to a wiper arm.

A connecting apparatus for the articulated connection of a wiper blade of flat beam design, which is suitable for different wiper arms, is known from the German patent publication DE 20 2005 021 307 U1. The connecting apparatus comprises at least one one-piece or multi-piece connecting element which is rigidly but detachably fastened to a carrier element in the form of spring rails. According to the invention, an adapter is located between each wiper arm and the wiper blade, said adapter comprising on the one hand connection options for the connecting element and on the other hand connection options for one of the wiper arms or joining elements, which are rigidly connected to the respective wiper arm or are integrally formed on said wiper arm. A joint, the joint axis of which extends transversely to the longitudinal direction of the wiper blade, is disposed between one of the joining elements and an adapter, which is connected to the connecting element in a rotationally fixed manner or between a part of the adapter connected to said connecting element in a rotationally fixed manner and a part of said adapter connected to the joining element in a rotationally fixed manner. Thus, three different adapters for three different joining elements of the wiper arms ensue.

The connecting apparatus is suited to a wiper arm having a hook-shaped end or joining element or an end, respectively joining element, having a lateral bearing pin and a bridge which correspond to a known side-lock principle. Said connecting apparatus is also suited to a wiper arm having an end or joining element, wherein the wiper arm extends substantially in a straight line above the wiper blade and is connected to the connecting element according to the top-lock principle. Another connecting apparatus for the articulated connection of a wiper blade to a wiper arm is known from the German patent publication DE 103 47 637 A1. In this case, a connecting element in the form of a sheet metal claw comprises a central longitudinal web, which faces away from the carrier element of the wiper blade and into which a pivot spindle, which runs transversely, is inserted in a rotationally fixed manner. An adapter with bearing openings, which are arranged in lateral spring tongues, is pivotably mounted on the pivot spindle which protrudes in a floating manner on both sides of the longitudinal web. The adapter, which is manufactured from plastic, encircles the metal claw from the outside and is clipped into a joining element, which is open towards the wiper blade and fixedly connected to the wiper arm, by means of detent elements and retaining elements. Said adapter is firstly guided laterally by means of inner guide webs on the sheet metal claw and is secondly inserted at the sidewalls thereof in the joining element in a manner free from play. A push button, which is provided in a cover wall of the adapter at the end of a spring tongue and, in the fitted state, latches into a matching detent hole in a cover wall of the joining element, serves to fix said adapter in said joining element.

A wiper blade for glass panes of motor vehicles is known from the German patent publication DE 10 2006 031 514 A1, which has a connecting element in the central region for the articulated connection to a wiper arm. The connecting element comprises a base element, which is composed of two side parts having open longitudinal grooves facing one another. Said side parts sit with said grooves on spring rails serving as the carrier element. Said spring rails are partially embedded in lateral longitudinal grooves of a wiper strip and protrude to a certain extent laterally beyond said longitudinal grooves of the wiper strip at least in the region of the connecting element. The longitudinal grooves of the base element are bounded at the bottom by a lower leg and at the top by an upper leg. A projection is disposed in an end region on the upper leg and a recess is disposed in the other end region, which in each case are directed towards the opposite side part. The projection of the one side part fits into the recess of the other side part and vice versa. In the assembled state, the projections fix the side parts longitudinally relative to one another in the recesses and define the distance of said longitudinal grooves transversely to the wiper blade. Two contact surfaces, which run inclined to the longitudinal direction, are situated in each case on one side of each projection or recess, wherein the contact surfaces form a convex roof area at the projection which fits into a concave roof area, which is formed by the contact surfaces at the recesses. Thus, the side parts are locked in the direction of the vertical axis.

A detent hook is provided on the sides of the recess opposite to the contact surfaces, which engages in a detent depression on the projection of the respective other side part. The projections and the associated recesses comprising the associated contact surfaces and detent hooks form a guide block, which engages in a recess in a base of a sheet metal claw. The sheet metal claw, which forms the actual connecting part, encompasses the side parts from the outside with feet, which project in an angled manner from the base. At the ends of said metal claw, longitudinally oriented lugs, which are bent into corresponding recesses of the base element during assembly, are integrally formed on the feet thereof. Starting from the base of said sheet metal claw, side walls are bent in opposite directions at approximately 90 degrees between said feet. The side walls carry a bearing pin as the joint part, which is riveted to said side walls.

SUMMARY OF THE INVENTION

According to the invention, the adapter comprises means, which are suited for mounting and fixing of three different joining elements. A plurality of different applications can thereby be covered by the same adapter. The joining elements can be integrally formed on the end of the wiper arm facing towards the wiper blade or can be manufactured as separate components and are rigidly connected to the wiper arms.

According to one embodiment of the invention, the means for mounting and fixing the different joining elements on the adapter consist of an end edge of the cover wall facing toward the rear end wall, two rearwardly facing holding cams in the region of the end edge, two steps situated laterally in the region of said end edge, which are integrally formed on the side walls so as to be concave toward the rear end wall, and two locking mechanisms distributed in each case on the two side walls in the vicinity of the rear end wall. In so doing, the locking mechanisms advantageously comprise contact surfaces and in each case a chamfer, which face the front end wall. Hence a first joining element comprising a u-shaped cross-section can, for example, partially encompass the side walls of the adapter with the side walls thereof and rest with an edge of the cover wall thereof against the end edge of the cover wall of said adapter, which faces the rear end wall, and in the process engage with said cover wall thereof under holding cams on the cover wall of said adapter. In the assembled position, the end edges of the side walls of the joining element can furthermore rest on the steps of said adapter. Said steps are integrally formed on the side walls of said adapter so as to be concave toward the rear end wall. Furthermore, the end faces of two guide flanges running in the longitudinal direction, which face the rear end wall of said adapter, are fixed to the contact surfaces of the locking mechanism of said adapter.

Whereas a laterally cranked connecting profile with respect to the wiper arm is provided in the case of the first joining element, so that the wiper arm runs laterally to the wiper blade in the assembled position, the connecting profile of a second joining element is disposed in the longitudinal direction of the joining element; thus enabling the wiper arm to run above the wiper blade. The second joining element has a lug on the front side thereof, which is cranked toward the wiper blade and is pushed under the cover wall of the adapter during assembly. In the end position, the lug abuts with the end face thereof against a stop below the cover wall of the adapter. The second joining element is affixed in the adapter by a projection which rests with an undercut on a chamfer of the locking mechanism of the adapter. A third locking mechanism, which is similar to the second one, comprises a stop which runs in a straight line practically vertically in relation to the lower edge in the direction of the wiper blade. The stop is supported on a matching contact surface of the locking mechanism.

The connecting apparatus according to the invention opens further options for connecting different wiper arm ends or joining elements to the connecting element of the wiper blade by the adapter comprising means, which are suited to mounting and fixing an insert, which comprises two double walls having respectively an interstice. Said double walls are connected to one another by means of a middle part and are at least partially covered on both sides by side walls of the adapter. The middle part is set back with respect to the upper boundary of the double walls so that said double walls form in each case an overhang with respect to said middle part. Wiper rods of different wiper arms can be guided between said overhangs. In addition, the middle part has a longitudinal channel, which is open to the front end wall, wherein said middle part is set back to a certain extent from the front side of the insert in the longitudinal direction. It is possible by means of this configuration to mount a wiper rod having a hook-shaped end and a small bent part by a lower leg of the hook-shaped end engaging through the end-face opening in the guide channel. In a similar manner, a wiper rod having a larger bent part on the hooked-shaped end thereof can be mounted by the bent part overlapping the opening of the guide channel and the lower leg resting on the lower side of the insert.

In the case of a sixth type of a wiper arm, the joining element is formed by a cranked end of a wiper rod. The wiper rod comprising the cranked end is laid between the overhangs of the insert and inserted into the opening of the adapter. Said wiper rod is thereby pushed in the direction of the front end wall of the adapter to the extent that the end face of said wiper rod rests on the inner side of the front end wall and engages with a detent hole on a detent hook on the rear end wall of the adapter.

Finally the connecting options of the connecting apparatus according to the invention can be supplemented by a further modification, which allows for a connection according to the side-lock principle. Thus, in a further embodiment of the invention, the insert comprises a bearing hole running in a transverse direction for receiving a bearing pin of a joining element. The bearing hole aligns with bearing holes in the side walls of the adapter. The connection between the adapter and the joining element occurs in accordance with the side-lock principle, wherein a bridge comprising an angled end overlaps the insert and consequently fixes said adapter with said insert in the longitudinal direction of the bearing pin. Because said adapter is pivotally connected to the joining element, the angled end of the bridge is bent toward the insert to such an extent that an oscillating motion in the bearing journals of said joining element is avoided. In so doing, the angled end of the bridge advantageously engages in a recess, which is disposed on the outer side of the associated double wall of the insert and is offset with respect to the bearing hole toward the rear end wall of said adapter. In principle, bearing holes can be provided in both double walls and recesses can be provided on both outer sides of the double walls, whereby further applications ensue. If, however, only one recess is provided, it is advantageous for the bearing hole to be closed on the side of the recess for optical and air-flow reasons.

In order to obtain a connecting apparatus of flat beam design despite the numerous connecting options, it is advantageous for the connecting element and the adapter to be manufactured from plastic, said adapter comprising a web extending along a longitudinal center plane, which carries bearing journals running transversely to the longitudinal direction in the central region thereof. The longitudinal web as well as the bearing journals protrude to a certain extent beyond the side walls of said adapter, wherein the protruding part of said longitudinal web is guided between two contact surfaces, which run in the longitudinal direction and are offset in relation to one another so that in the assembled position each longitudinal side of said longitudinal web rests against an associated contact surface and said longitudinal web can be rotated through an angle of approximately 45° about a vertical axis between the contact surfaces. Furthermore, the length of the bearing journals is dimensioned so that in the assembled position, the free ends of said journals engage in bearing holes in the side walls of the connecting element. In order to facilitate the mounting and centering of the adapter, said longitudinal web is guided radially at the end faces thereof on guide surfaces of the connecting element.

Moreover, it is advantageous for the connecting element to comprise a connecting part and a base element, which is divided into two side parts in the longitudinal direction and has mutually facing, open longitudinal grooves, which encompass a carrier element. The mutually facing sides of the base element are also connected to one another by detent connections. In addition to the detent connections, the side parts are laterally held together by the connecting part by means of the side walls of said connecting part engaging via detent cams situated on the inner sides thereof in recesses on the outer sides of the side parts.

Additional advantages ensue from the following descriptions of the drawings. Exemplary embodiments of the invention are depicted in said drawings. The drawings, the description and the claims contain numerous features in combination. The specialist in the field will both advantageously consider the features individually and combine them to form useful additional embodiments.

The following are shown.

DETAILED DESCRIPTION

Figure 1:
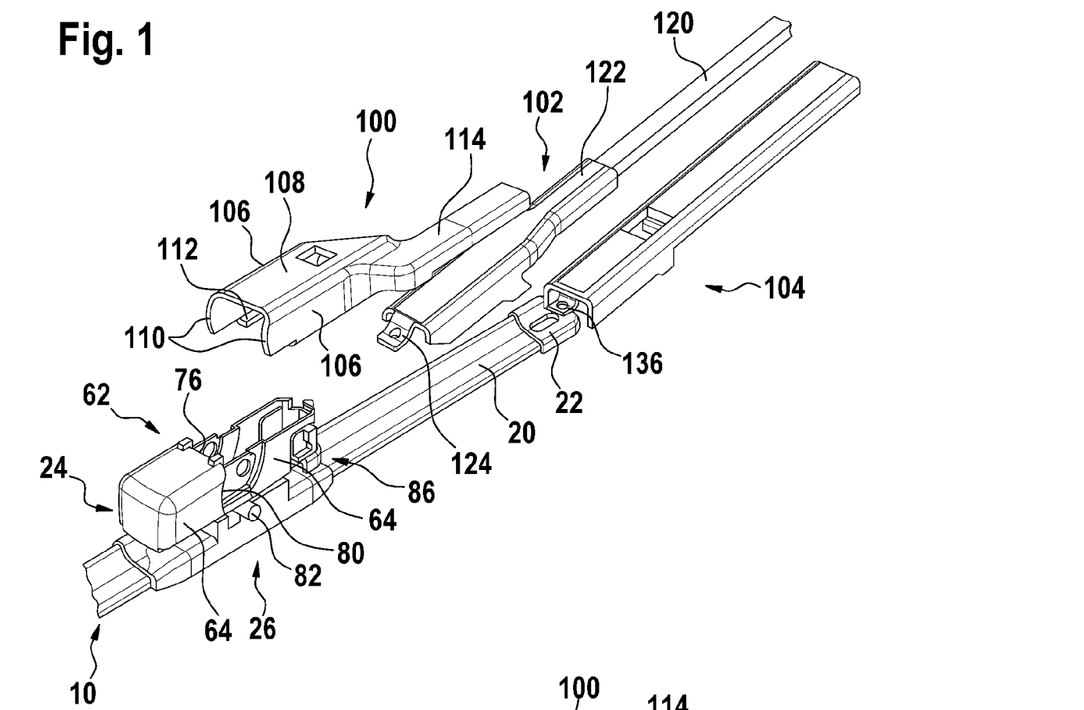
FIG. 1 an assembly drawing in perspective view of a connecting apparatus according to the invention comprising three different joining elements, FIG. 2 a perspective view of a connecting apparatus according to the invention during assembly of a first joining element, FIG. 3 a perspective view of the first joining element during assembly with an adapter, FIG. 4 a perspective side view of the first joining element mounted on an adapter, FIG. 5 a perspective view of a connecting apparatus according to the invention during the assembly of a second joining element, FIG. 6 a perspective view of the second joining element mounted on an adapter, FIG. 7 a sectional view corresponding to the line VII-VII in FIG. 6, FIG. 8 a perspective view of a connecting apparatus according to the invention during the assembly of a third joining element, FIG. 9 a perspective view of the third joining element mounted on an adapter, FIG. 10 a sectional view corresponding to the line X-X in FIG. 9, FIG. 11 an assembly drawing in perspective view of a connecting apparatus according to the invention comprising an insert and four additional different joining elements, FIG. 12 a perspective view of a connecting apparatus according to the invention during the assembly of a fourth joining element, FIG. 13 a perspective view of the fourth joining element mounted on an adapter comprising an insert, FIG. 14 a perspective view according to FIG. 13 of an opposing side of the adapter, FIG. 15 a perspective view of a fifth joining element in the form of a wiper rod having a hook-shaped end during assembly on an insert, FIG. 16 a longitudinal cut through the insert, FIG. 17 a modification to FIG. 16 comprising a sixth joining element having a larger, hook-shaped end, FIG. 18 the insert during the assembly of a seventh joining element in the form of a cranked end of a wiper rod, FIG. 19 a longitudinal cut through the adapter during the assembly of the insert comprising the wiper rod, FIG. 20 a longitudinal cut through the adapter comprising the mounted insert and the mounted wiper rod and FIG. 21 a perspective view of an arrangement of several parts of the connecting apparatus according to the invention during assembly.
Figure 21:
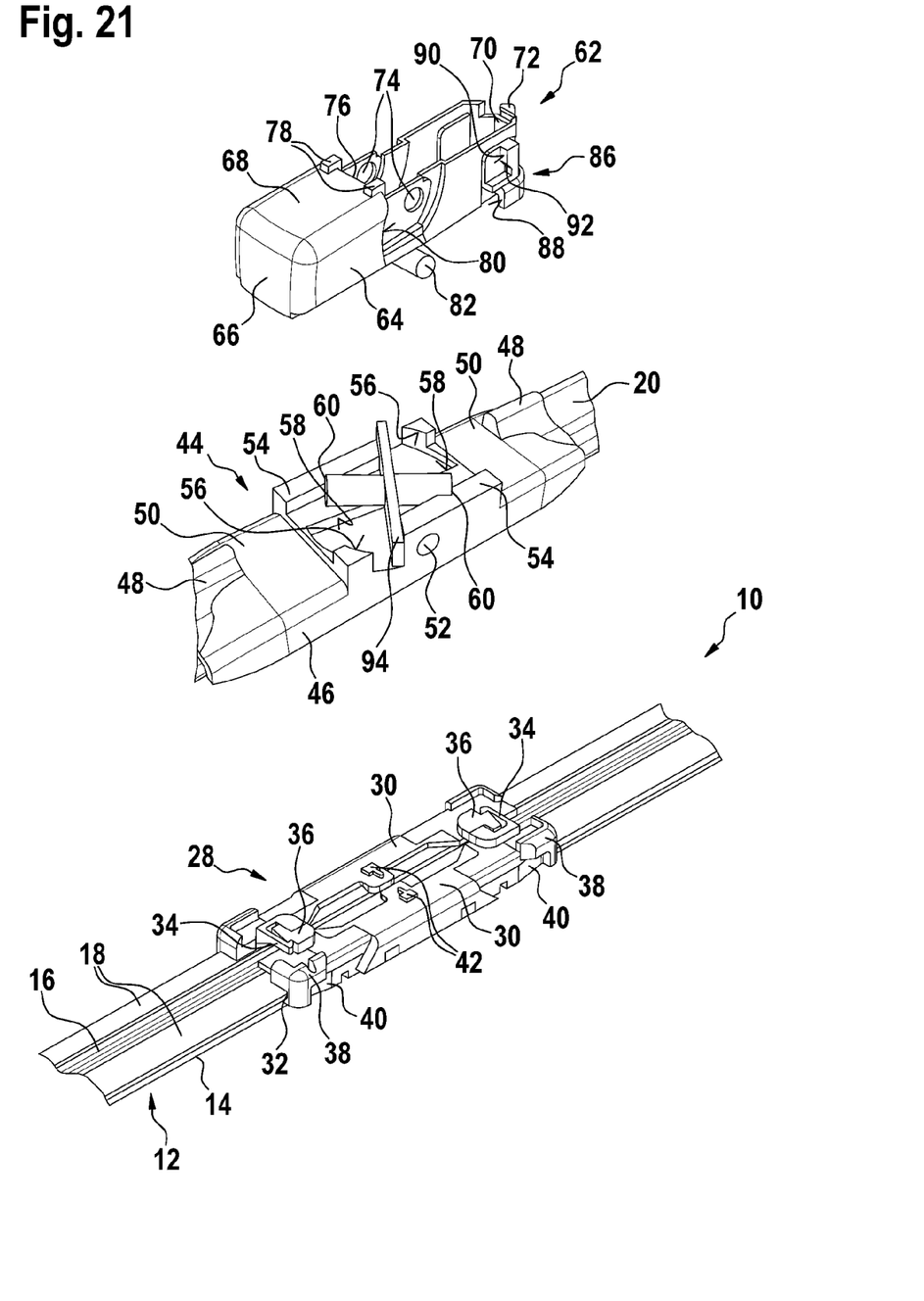

Only so much is shown from a wiper blade 10 depicted in FIG. 1 as well as from the associated wiper arms as is necessary for understanding the invention. The wiper blade 10 as depicted in FIG. 1 and FIG. 21 comprises a wiper strip 12 having a wiper lip 14, which typically is connected to a head strip 16 by means of a tilting web that is not visible. Said head strip is held by a carrier element 18 in the form of two flat, pre-bent spring rails, which are inserted into longitudinal grooves of the head strip 16 and protrude to a certain extent out of the same. The protruding parts of the carrier element 18 engage in longitudinal grooves 32 of a base element 28 belonging to the connecting element 26 of a connecting apparatus 24 according to the invention. Spoilers 20, which are closed on the ends thereof with end caps 22, are attached on said carrier element 18 to both sides of said connecting element 26.

The base element 28 is divided in the longitudinal direction into two side parts 30. On the mutually facing sides of the side parts 30, said side parts comprise respectively a detent hook 34 on the ends thereof, which interacts with a detent depression 36 of the respective other side part 30. Said side parts 30 are held together by the detent connection 34, 36. In addition, the cohesion of said side parts 30 is supported by a connecting part 44, which is placed during assembly onto the base element 28 in the direction of a vertical axis and laterally encompasses said side parts 30 of said base element 28 with the side walls 46 thereof. In the process, unspecified detent cams engage in recesses 40 below reinforcements 38 of said side parts 30 of said base element 28. Said side parts 30 comprise centering bosses 42 in the central region thereof, which ensure the relative position of said base element 28 to the connecting part 44.

Whereas the base element 28 serves to connect the connecting element 26 to the carrier element 18, the connecting part 44 is provided for the articulated connection of said connecting element 26 to an adapter 62. Both side walls 46 of said connecting part 44 are connected to one another by a cover wall 50, toward the ends of which connecting profiles 48 for the spoilers 20 of the wiper blade 10 can connect. The side walls 46 comprise super-elevated parts 54, in which bearing holes 52 are provided, in the central region thereof.

The side walls 64, which are connected to one another by a front end wall 66 and a rear face wall 70, form a frame, which is closed in the region of the front end wall 66 by a cover wall 68. Said cover wall projects to a certain extent toward the central region of the adapter 62 and ends with a straight end edge 76, on which holding cams 78 are provided, which face the rear end wall 70. The adapter 62 has an opening 74 between the end edge 76 and the rear end wall 70.

The adapter 62 additionally has a longitudinal web 94 comprising bearing journals 82, which align with one another and engage during assembly in bearing holes 52 of the connecting part 44, in the longitudinal center plane of said adapter. The longitudinal web 94 and the bearing journals 82 protrude to a certain extent beyond the side walls 64 of the adapter 62 toward the connecting element 26.

Figure 2:
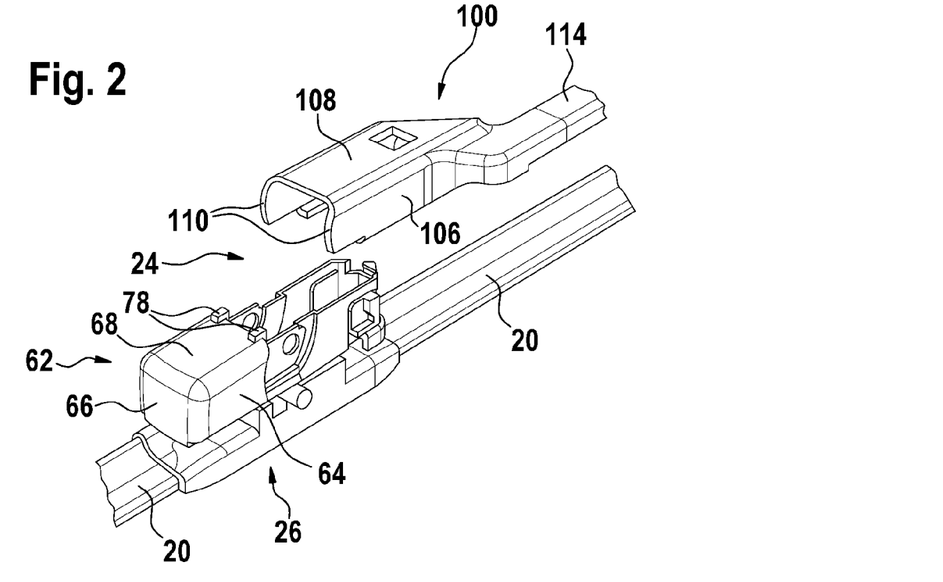

During assembly, the adapter 62 is rotated through an angle of approximately 45° to the longitudinal direction of the wiper blade 10 and placed onto the connecting element 26 in the direction of a vertical axis. The adapter 62 is subsequently rotated back again until the longitudinal web 94 thereof points in the longitudinal direction and rests in each case with a side surface against the contact surfaces 58 of the connecting part 44, which likewise run in the longitudinal direction and are offset with respect to one another in the longitudinal direction. In this position the bearing journals 82 engage into the bearing holes 52. In order to facilitate the engagement, guide tracks 60 are advantageously disposed in front of the bearing holes 52, along which the end faces of the bearing journals 82 slide until they engage into said bearings holes 52. When the adapter 62 is rotated into the end position, said adapter 62 is guided at the end faces of the longitudinal web along guide surfaces 56 of the connecting part 44. FIG. 2 shows an adapter 62 pre-mounted on the wiper blade 10. It can be clearly seen that said adapter 62 is situated toward both ends at an adequate distance from the spoilers 20 and the connecting profiles 48; thus enabling said adapter 62 to be provided with an adequate pivot angle.

Figure 3:
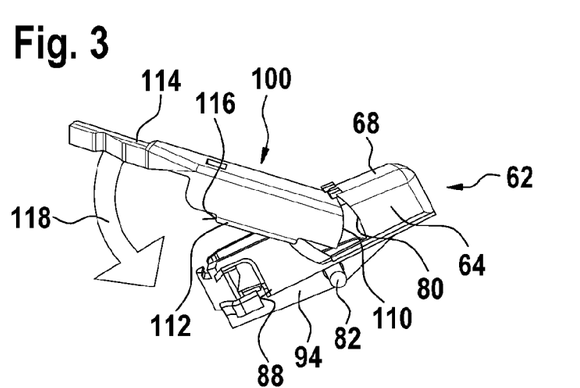

The adapter 62 has means for mounting and fixing three conventional joining elements 100, 102 and 104, which are fixedly connected to a wiper arm by being integrally formed on said wiper arm or fastened to said wiper arm as a separate component. A first joining element 100 comprises a u-shaped cross-sectional profile having side walls 106 and a cover wall 108. A connecting profile 114 for an unspecified wiper arm attaches to a side wall 106. The joining element 100 further comprises guide flanges 112, which project to the inside, on the free edges of the side walls 106 thereof, said flanges having end faces 116 on the ends thereof. The end edges 110 of the side walls 106 facing the front end wall 66 of the adapter 62 are designed convexly and match with concavely shaped steps 80 of the side walls 64 of said adapter 62.

Figures 4, 5, 6:
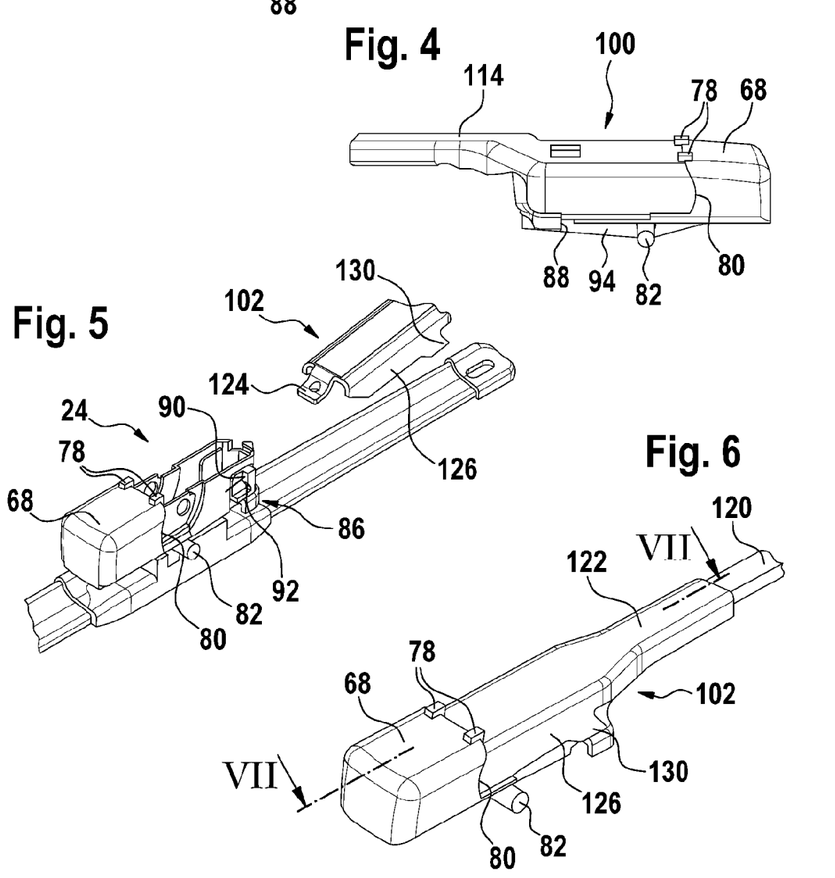

During assembly, the joining element 100 is pushed with the side walls 106 thereof over the side walls 64 of the adapter 62 until the end edges 110 thereof rest against the steps 80 and the cover wall 108 of said joining element 100 is adjoined by the end edge 76 of the cover wall 68 of the adapter 62, wherein holding cams 78 on said cover wall 68 of said adapter 62 overlap to some extent the cover wall 108 of said joining element 100. If said joining element 100 is pivoted in the direction of the arrow 118, the end faces 116 of the guide flanges 112, which face the rear end wall 70, engage on contact surfaces 88 of the locking mechanisms 86, which are disposed on the side walls 64 in the region of the rear end wall 70. Thus, said joining element 100 is secured in the longitudinal direction of said adapter 62, whereas said element is secured in the direction of a vertical axis by the concave steps 80 in conjunction with the convex end edges 110 and the holding cams 78.

Figure 7:
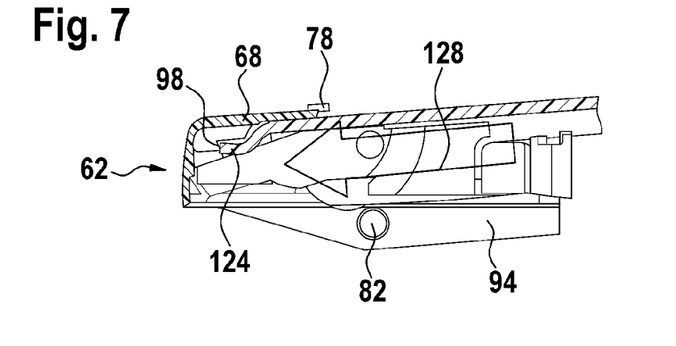

The second joining element 102 has a similar design. It is rigidly connected to a wiper rod 120 via a connecting profile 122, wherein the connecting profile 122 extends in the extension of the joining element 102 so that the wiper rod 120 runs above the wiper blade 10. A lug 124, which is perforated and cranked towards the connecting element 26, is integrally formed on the front end face of said joining element 102. During assembly, the lug 124 is pushed in the direction of the arrow 128 under the cover wall 68 of the adapter 62 until the end face of said lug 124 abuts against a stop 98 of said adapter 62 and is supported there. If said joining element 102 is pivoted into the operating position, projections 130 on the side walls 126 engage on chamfers 92 in the region of the locking mechanisms 86. The chamfers 92 face the front end wall 66 and secure said joining element 102 additionally in the direction of a vertical axis by fitting into undercuts of the projections 130.

Figure 8:
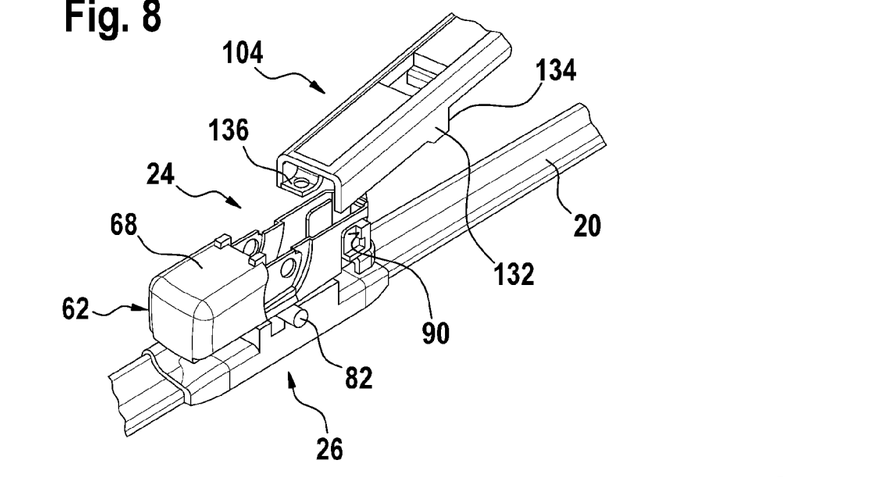
Figure 9:
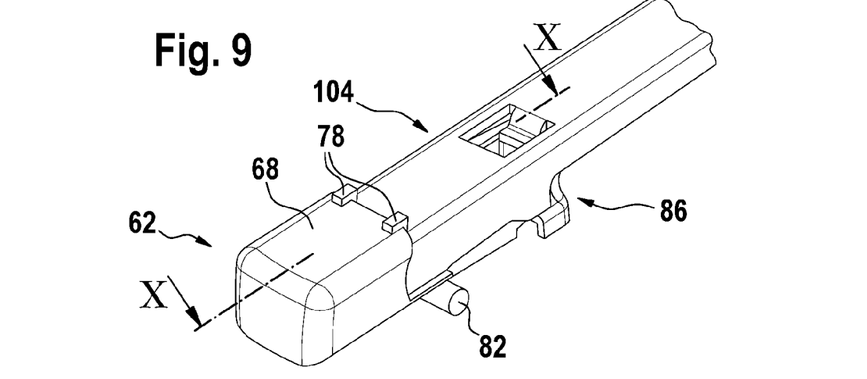
Figure 10:
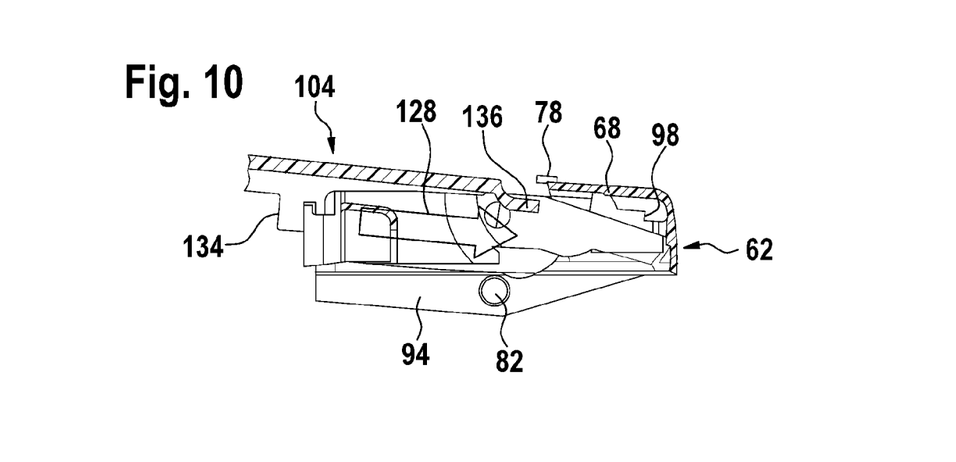

The third joining element 104 is integrally formed on the wiper arm. In contrast to the second joining element 102, it has projections 132 including stops 134, which run approximately vertically to the lower edge of the side walls of the joining element 104 and are supported on contact surfaces 90 of the locking mechanisms 86. It is otherwise mounted like the second joining element 102 by a lug 136 being pushed under the cover wall 68 of the adapter 62.

Figure 11:
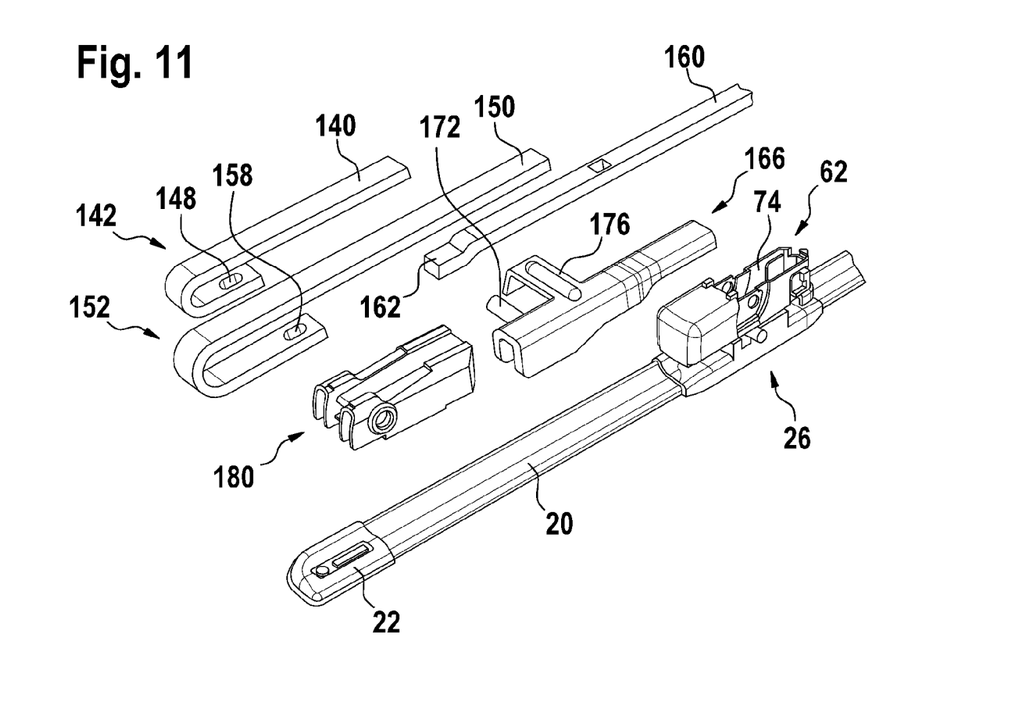

By means of an insert 180, the connecting options of the adapter 62 can be expanded by four modifications. The insert 180 comprises two side walls, which run parallel to one another and are in the form of double walls 182, which form an interstice 184 for receiving the side walls 64 of said adapter 62. A middle part 192 joins the inner walls of the double walls 182 to one another, wherein said middle part recoils to some extent with respect to the upper edge of said double walls 182. Overhangs 186 are thereby formed on both sides of said middle part 192, between which wiper rods 140, 150 and 160 can be guided. In addition, said middle part 192 has a longitudinal channel 194 including at least one opening 196 oriented towards the front end wall 66 of the adapter 62. The front side of said middle part 192 is set back to some extent with respect to said double walls 182; thus enabling adequate space to remain for joining elements of the wiper rods 140, 150, 160 in the form of hook-shaped ends 142, 152 or a cranked end 162.

Figure 15:
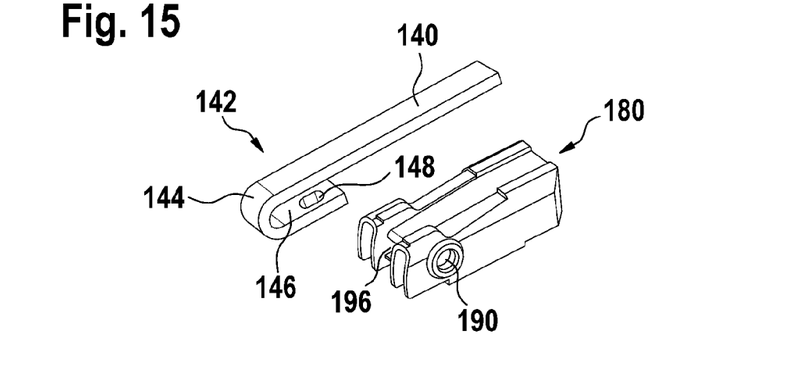
Figure 16:
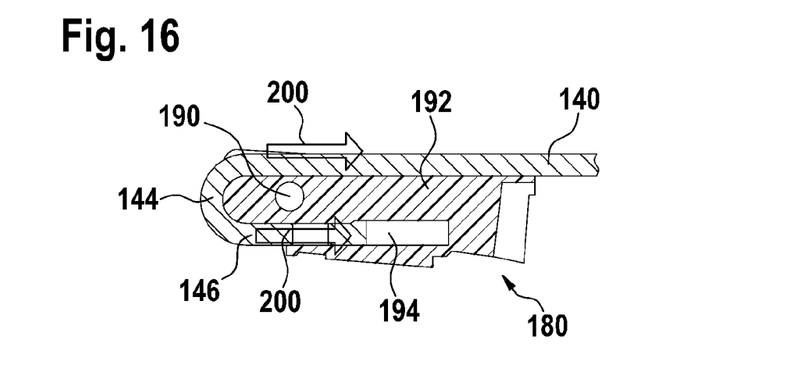
Figure 17:
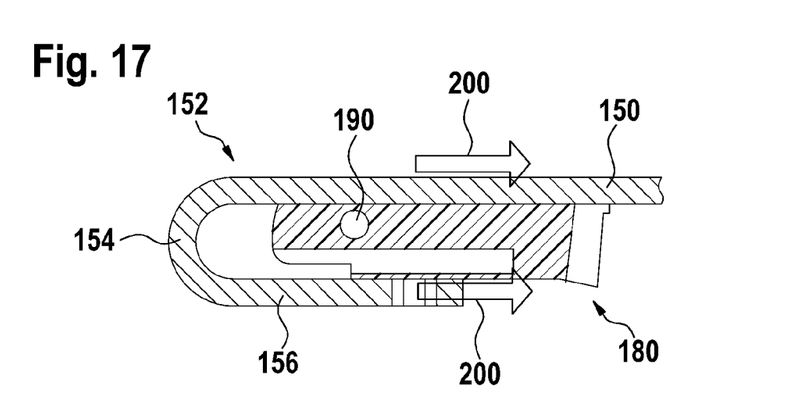

The hook-shaped end 142 of the wiper rod 140 comprises a smaller bent part 144 than the hooked-shaped end 152 of the wiper rod 150; thus enabling the lower leg 146 thereof, which has a detent hole 148, to be threaded into the opening 196 of the longitudinal channel 194 in the direction of the arrows 200. In contrast the hook-shaped end 152 has a larger bent part 154; and as a result, the lower leg 156 thereof rests against the bottom side of the insert 180. The lower leg 156 has a detent hole 158.

Figure 18:
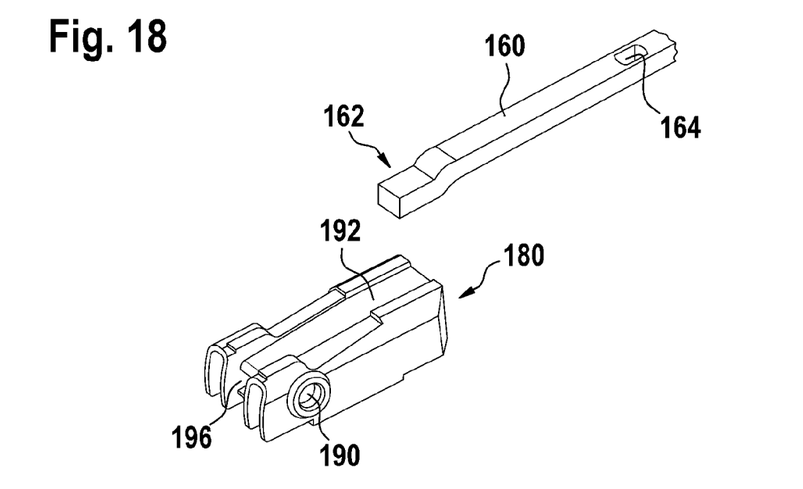
Figure 19:
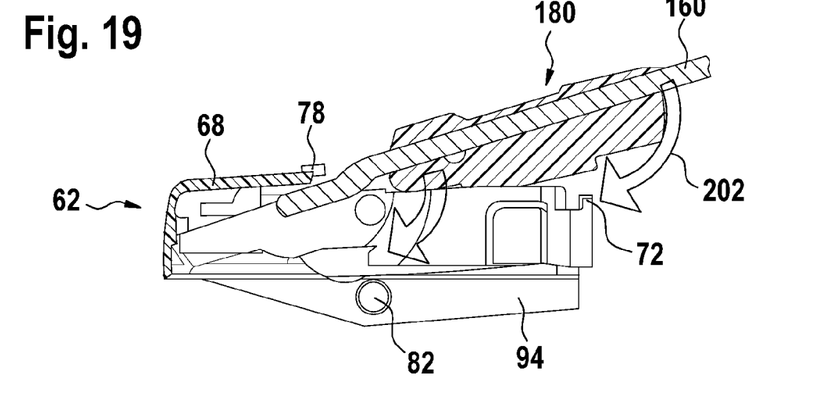
Figure 20:
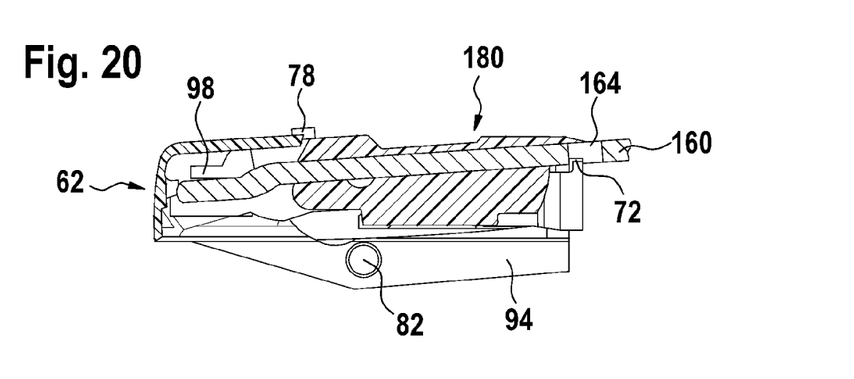

The wiper rod 160 including the cranked end 162 thereof has a detent hole 164. Said rod is pushed with the cranked end 162 under the cover wall 68 of the adapter 62 until the end edge thereof rests on the inner side of the front end wall 66 below the stop 98. When said rod is pivoted in the direction of the arrows 202 during assembly, the detent hole engages on a detent hook 72 on the rear end wall 70 of the adapter 62, so that said wiper rod 160 is secured with the cranked end 162 thereof in the longitudinal direction as well as in the direction of a vertical axis.

Figure 12:
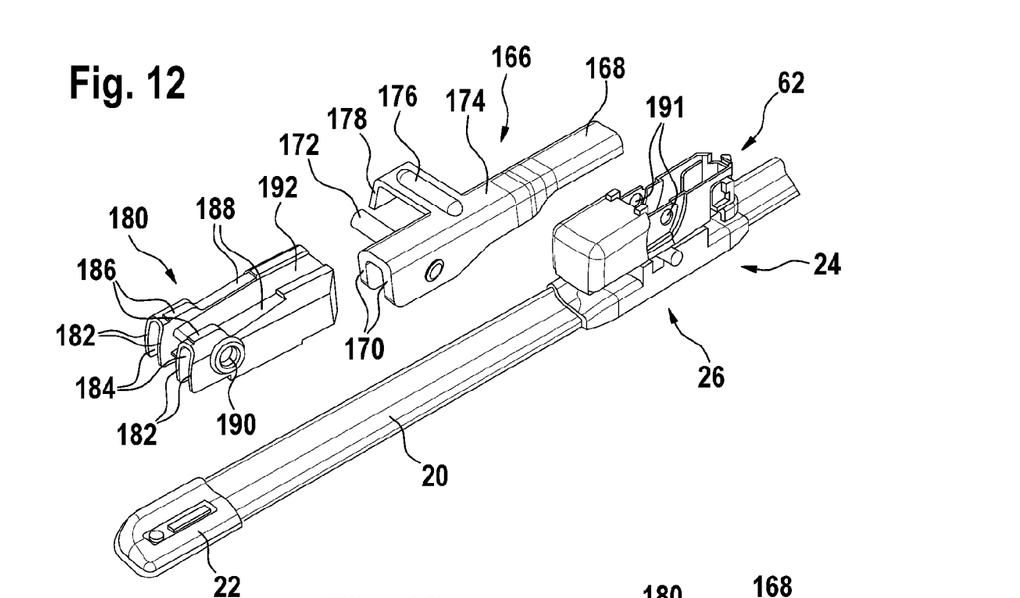
Figure 13:
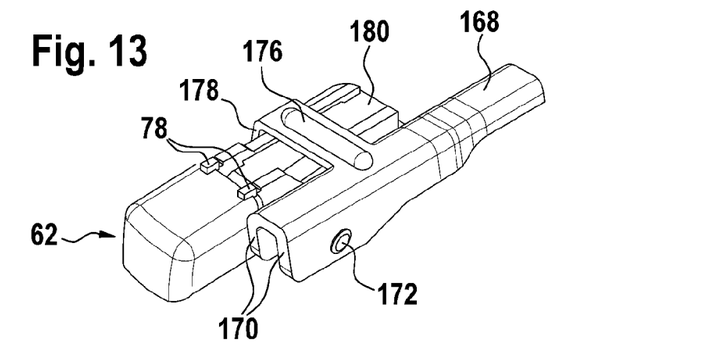
Figure 14:
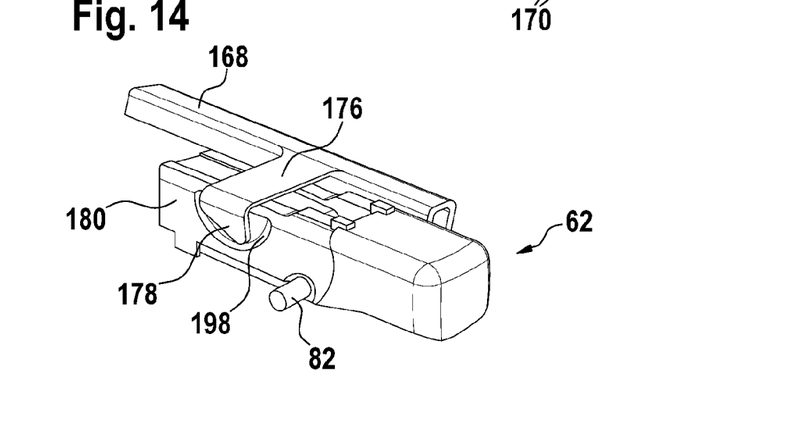

Finally a wiper arm can be connected to the adapter 62 via a joining element 166 of the side-lock connection type. In this case, the insert 180 has a bearing hole 190 in the double walls 182 and the middle part 192 thereof, which runs in the transverse direction and which aligns with bearing holes 191 in the side walls 64 of the adapter 62. The bearing holes 190, 191 serve to receive a bearing pin 172, which is mounted in a cantilevered manner in the legs 170 of a u-shaped profile of the joining element 166. The legs 170 are connected to one another by a cover wall 174, on which a bridge 176 running parallel to the bearing pin 172 is integrally formed, said bridge being offset with respect to the rear end wall 70 of the adapter 62. On the same side, as seen in the longitudinal direction, the joining element 166 has a connecting profile 168 for connecting to an unspecified wiper arm.

The bridge 176 overlaps the insert 180 with an angulated end 178, said bridge engaging in depressions 188 of the double walls 182. The angulated end 178 rests against the outer side of said insert 180. Said end is pressed against the outer wall and grips into a recess 198 on the associated double wall 182. In so doing, the adapter 62 is prevented from pivoting about the bearing pin 172. The pivoting of the wiper blade 10 relative to the wiper arm or the joining elements thereof occurs exclusively via the bearing holes 52 of the connecting element 26 and the bearing journals 82 of the adapter 62.

In total, seven different joining options can thus be implemented by means of the inventive adapter including the insert thereof, wherein a very flat construction as well as an appealing design is achieved.

The invention claimed is:

1. A connecting apparatus (24) for hinging a joining element (100, 102, 104, 142, 152, 162, 166), which is rigidly connected to a wiper arm, by way of an adapter (62), which is held non-rotatably by the joining element (100, 102, 104, 142, 152, 162, 166), to a connecting element (26) fastened to a wiper blade (10), wherein between said connecting element (26) and the adapter (62) a joint (52, 82) running transversely to a longitudinal direction of the wiper blade (10) is provided, and said adapter (62) forms a frame of two side walls (64), of a front end wall (66) and a rear end wall (70), the frame being partially covered toward the top in the region of the front end wall (66) by a cover wall (68) such that an opening (74)

remains toward the rear end wall (70), the opening (74) being disposed rearward of the cover wall (68) and being defined as a cavity formed by the two side walls (64) and the rear end wall (70), characterized in that said adapter (62) has means (76, 78, 80, 86) for mounting and fixing three different joining elements (100, 102, 104).

2. A connecting apparatus (24) according to claim 1, characterized in that the means for mounting and fixing the different joining elements (100, 102, 104) on the adapter (62) comprise an end edge (76) facing the rear end wall (70), two holding cams (78) facing rearwards in the region of the end edge (76), two steps (80) which are disposed laterally in the region of said end edge (76) and formed concavely toward the rear end wall (70), and two locking mechanisms (86) distributed respectively on both side walls (64) in the vicinity of said rear end wall (70), wherein the opening (74) is disposed rearward of the edge (76) and the two holding cams (78).

3. A connecting apparatus (24) according to claim 2, characterized in that the locking mechanisms (86) comprise contact surfaces (88, 90) and in each case a chamfer (92), which face toward the front end wall (66), the chamfer (92) defining a notch that secures a second joining element (102) in a direction of a vertical axis that is perpendicular to the longitudinal direction.

4. A connecting apparatus (24) according to claim 3, characterized in that a first joining element (100) having a u-shaped cross-section partially encompasses with side walls (106) thereof the side walls (64) of the adapter (62), engages with an edge of a cover wall (108) thereof under holding cams (78) on the cover wall (68) of said adapter (62), rests in an assembled position with end edges (110) of the side walls (106) thereof against the step (80) formed concavely toward the rear end wall (70) and is fixed with end faces (116) of two guide flanges (112) to the contact surfaces (88) of the locking mechanisms (86) of said adapter (62).

5. A connecting apparatus (24) according to claim 3, characterized in that the second and a third joining element (102, 104) have in each case a lug (124, 136) on front sides thereof, said lug being cranked toward the wiper blade (10) and engaging under the cover wall (68) of the adapter (62) as well as being supported in the longitudinal direction at a stop (98) of said adapter (62), whereas projections (130) of the side walls (106) of the joining element (102, 104) are lockably engaged in an assembled state on the contact surfaces (90) and where applicable on the chamfers (92) of the locking mechanism (86), which adjoin said contact surfaces in the direction of the wiper blade (10).

6. A connecting apparatus (24) according to claim 1, characterized in that the adapter (62) comprises means (72, 76, 78, 80, 86, 191), which are suited for mounting and fixing an insert (180), which includes two double walls (182) having respectively an interstice (184), which are connected to one another by way of a middle part (192) and at least partially cover the side walls (64) of the adapter (62) on both sides, wherein the middle part (192) is set back with respect to an upper boundary of the double walls (182) so that said double walls (182) in each case form an overhang (186) and wherein said middle part (192) has a longitudinal channel (194) which is open toward the front end wall (66) and said middle part (192) is set back in the longitudinal direction from a front side of the insert (180).

7. A connecting apparatus (24) according to claim 1, characterized in that the adapter (62) comprises means (72, 76, 78, 80, 86, 191), which are suited for mounting and fixing an insert (180) which includes two double walls (182) having respectively an interstice (184), which are connected to one another by way of a middle part (192) and at least partially cover the side walls (64) of said adapter (62) on both sides, wherein the middle part (192) is set back with respect to an upper boundary of the double walls (182) so that said double walls (182) in each case form an overhang (186), said double walls additionally having respectively a depression (188), and in that the insert (180) has a bearing hole (190) running transversely to the longitudinal direction of the wiper blade (10), which aligns with bearing holes (191) in the side walls (64) of said adapter (62).

8. A connecting apparatus (24) according to claim 7, characterized in that at least one double wall (182) has a recess (198) on an outer side thereof, which is offset with respect to the bearing hole (190) toward the rear end wall (70) of the adapter (62).

9. A connecting apparatus (24) according to claim 8, characterized in that the bearing hole (190) is closed on a side of the recess (198).

10. A connecting apparatus (24) according to claim 1, characterized in that the connecting element (26) and the adapter (62) are manufactured from plastic, wherein said adapter (62) has a longitudinal web (94) extending along a longitudinal center plane, said web supporting a bearing pin (82), which runs transversely to the longitudinal direction, in a central region of the web and in that the longitudinal web (94) and the bearing pin (82) protrude beyond the side walls (64) of said adapter (62) toward said connecting element (26), a part of said longitudinal web (94) protruding toward said connecting element (26) being guided between two contact surfaces (58), which run in the longitudinal direction and are offset in relation to one another so that in an assembled position, each longitudinal side of said longitudinal web (94) rests against a contact surface (58) and said longitudinal web (94) can be rotated during assembly through an angle of approximately 45° about a vertical axis and in that the length of the bearing pin (82) is dimensioned so that in the assembled position, both ends of the pin engage in bearing holes (52) in the side walls (46) of said connecting element (26).

11. A connecting apparatus (24) according to claim 10, characterized in that the longitudinal web (94) is guided radially at end faces thereof through guide surfaces (56) of the connecting element (26).

12. A connecting apparatus (24) according to claim 10, characterized in that the connecting element (26) comprises a connecting part (44), on which bearing holes (52) and contact surfaces (58) are disposed, and a base element (28) which is divided into two side parts (30) in the longitudinal direction and encompasses a carrier element (18) with mutually facing longitudinal grooves (32), the side parts (30) being connected to one another on mutually facing sides by detent connections (34, 36).

13. A connecting apparatus (24) according to claim 10, characterized in that in addition to the detent connections (34, 36), the side parts (30) are laterally held together by the connecting part (44) by way of the side walls (46) of said connecting part (44) engaging with detent cams on inner sides thereof in recesses (40) on outer sides of said side parts (30).

14. A wiper blade (10) comprising a connecting apparatus (24) according to claim 1.

15. The connecting apparatus (24) according to claim 1, further comprising an insert (180), which is placed onto the side walls (64) of the adapter (62), said insert comprising side walls embodied as double walls.

16. A connecting apparatus (24) for hinging a joining element (100, 102, 104, 142, 152, 162, 166), which is rigidly connected to a wiper arm, by way of an adapter (62), which is held non-rotatably by the joining element (100, 102, 104, 142, 152, 162, 166), to a connecting element (26) fastened to a wiper blade (10), wherein between said connecting element (26) and the adapter (62) a joint (52, 82) running transversely to a longitudinal direction of the wiper blade (10) is provided, and said adapter (62) forms a frame of two side walls (64), of a front end wall (66) and a rear end wall (70), the frame being partially covered toward the top in the region of the front end wall (66) by a cover wall (68) such that an opening (74) remains toward the rear end wall (70), characterized in that said adapter (62) has means (76, 78, 80, 86) for mounting and fixing three different joining elements (100, 102, 104), and characterized in that the adapter (62) comprises means (72, 76, 78, 80, 86, 191), which are suited for mounting and fixing an insert (180), which includes two double walls (182) having respectively an interstice (184), which are connected to one another by way of a middle part (192) and at least partially cover the side walls (64) of the adapter (62) on both sides, wherein the middle part (192) is set back with respect to an upper boundary of the double walls (182) so that said double walls (182) in each case form an overhang (186) and wherein said middle part (192) has a longitudinal channel (194) which is open toward the front end wall (66) and said middle part (192) is set back in the longitudinal direction from a front side of the insert (180).

17. A connecting apparatus (24) for hinging a joining element (100, 102, 104, 142, 152, 162, 166), which is rigidly connected to a wiper arm, by way of an adapter (62), which is held non-rotatably by the joining element (100, 102, 104, 142, 152, 162, 166), to a connecting element (26) fastened to a wiper blade (10), wherein between said connecting element (26) and the adapter (62) a joint (52, 82) running transversely to a longitudinal direction of the wiper blade (10) is provided, and said adapter (62) forms a frame of two side walls (64), of a front end wall (66) and a rear end wall (70), the frame being partially covered toward the top in the region of the front end wall (66) by a cover wall (68) such that an opening (74) remains toward the rear end wall (70), characterized in that said adapter (62) has means (76, 78, 80, 86) for mounting and fixing three different joining elements (100, 102, 104), characterized in that the adapter (62) comprises means (72, 76, 78, 80, 86, 191), which are suited for mounting and fixing an insert (180) which includes two double walls (182) having respectively an interstice (184), which are connected to one another by way of a middle part (192) and at least partially cover the side walls (64) of said adapter (62) on both sides, wherein the middle part (192) is set back with respect to an upper boundary of the double walls (182) so that said double walls (182) in each case form an overhang (186), said double walls additionally having respectively a depression (188), and in that the insert (180) has a bearing hole (190) running transversely to the longitudinal direction of the wiper blade (10), which aligns with bearing holes (191) in the side walls (64) of said adapter (62).

18. A connecting apparatus (24) according to claim 17, characterized in that at least one double wall (182) has a recess (198) on an outer side thereof, which is offset with respect to the bearing hole (190) toward the rear end wall (70) of the adapter (62).

19. A connecting apparatus (24) according to claim 18, characterized in that the bearing hole (190) is closed on a side of the recess (198).

20. A connecting apparatus (24) for hinging a joining element (100, 102, 104, 142, 152, 162, 166), which is rigidly connected to a wiper arm, by way of an adapter (62), which is held non-rotatably by the joining element (100, 102, 104, 142, 152, 162, 166), to a connecting element (26) fastened to a wiper blade (10), wherein between said connecting element (26) and the adapter (62) a joint (52, 82) running transversely to a longitudinal direction of the wiper blade (10) is provided, and said adapter (62) forms a frame of two side walls (64), of a front end wall (66) and a rear end wall (70), the frame being partially covered toward the top in the region of the front end wall (66) by a cover wall (68) such that an opening (74) remains toward the rear end wall (70), characterized in that said adapter (62) has means (76, 78, 80, 86) for mounting and fixing three different joining elements (100, 102, 104), characterized in that the connecting element (26) and the adapter (62) are manufactured from plastic, wherein said adapter (62) has a longitudinal web (94) extending along a longitudinal center plane, said web supporting a bearing pin (82), which runs transversely to the longitudinal direction, in a central region of the web and in that the longitudinal web (94) and the bearing pin (82) protrude beyond the side walls (64) of said adapter (62) toward said connecting element (26), a part of said longitudinal web (94) protruding toward said connecting element (26) being guided between two contact surfaces (58), which run in the longitudinal direction and are offset in relation to one another so that in an assembled position, each longitudinal side of said longitudinal web (94) rests against a contact surface (58) and said longitudinal web (94) can be rotated during assembly through an angle of approximately 45° about a vertical axis and in that the length of the bearing pin (82) is dimensioned so that in the assembled position, both ends of the pin engage in bearing holes (52) in the side walls (46) of said connecting element (26).

21. A connecting apparatus (24) according to claim 20, characterized in that the longitudinal web (94) is guided radially at end faces thereof through guide surfaces (56) of the connecting element (26).

22. A connecting apparatus (24) according to claim 20, characterized in that the connecting element (26) comprises a connecting part (44), on which bearing holes (52) and contact surfaces (58) are disposed, and a base element (28) which is divided into two side parts (30) in the longitudinal direction and encompasses a carrier element (18) with mutually facing longitudinal grooves (32), the side parts (30) being connected to one another on mutually facing sides by detent connections (34, 36).

23. A connecting apparatus (24) according to claim 20, characterized in that in addition to the detent connections (34, 36), the side parts (30) are laterally held together by the connecting part (44) by way of the side walls (46) of said connecting part (44) engaging with detent cams on inner sides thereof in recesses (40) on outer sides of said side parts (30).

* * * * *